US012668159B2

(12) United States Patent
Dusini et al.

(10) Patent No.: US 12,668,159 B2
(45) Date of Patent: Jun. 30, 2026

(54) SEAT FOR A MOTOR VEHICLE

(71) Applicant: FERRARI S.P.A., Modena (IT)

(72) Inventors: Luca Dusini, Modena (IT); Patrizio Moruzzi, Modena (IT); Epifanio Alberto Nicoletta, Modena (IT); Fabio Toni, Modena (IT)

(73) Assignee: FERRARI S.P.A., Modena (IT)

( * ) Notice: Subject to any disclaimer, the term of this patent is extended or adjusted under 35 U.S.C. 154(b) by 198 days.

(21) Appl. No.: 18/668,617

(22) Filed: May 20, 2024

(65) Prior Publication Data

US 2024/0391365 A1     Nov. 28, 2024

(30) Foreign Application Priority Data

May 25, 2023     (IT) ........................ 102023000010572

(51) Int. Cl.
B60N 2/20          (2006.01)
B60N 2/22          (2006.01)
B60N 2/90          (2018.01)

(52) U.S. Cl.
CPC ................. B60N 2/22 (2013.01); B60N 2/20 (2013.01); B60N 2/99 (2018.02)

(58) Field of Classification Search
CPC .............. B60N 2/20; B60N 2/22; B60N 2/99
USPC .................................................. 297/452.48
See application file for complete search history.

(56) References Cited

U.S. PATENT DOCUMENTS

| | | | | |
|---|---|---|---|---|
| 11,198,379 B2 * | 12/2021 | Oshima | ............... | B60N 2/0252 |
| 11,279,272 B2 * | 3/2022 | Hoshi | ....................... | A47C 7/74 |
| 11,420,542 B2 * | 8/2022 | Toda | ..................... | B60N 2/682 |
| 11,932,141 B2 * | 3/2024 | Hoshi | ..................... | A47C 7/74 |
| 2005/0087325 A1 * | 4/2005 | Roland | ............... | B60N 2/5628 |
| | | | | 165/42 |
| 2016/0280038 A1 * | 9/2016 | Tanaka | ................... | B60H 1/244 |
| 2018/0201089 A1 * | 7/2018 | Fujii | .................... | B60N 2/5657 |
| 2024/0262268 A1 * | 8/2024 | Hoshi | ...................... | B60N 2/68 |
| 2024/0262340 A1 * | 8/2024 | Numajiri | ................. | A47C 7/72 |
| 2025/0214493 A1 * | 7/2025 | Hoshi | ..................... | B60N 2/20 |

FOREIGN PATENT DOCUMENTS

| | | | | |
|---|---|---|---|---|
| EP | 0558408 A1 * | 9/1993 | ............ | B60N 2/206 |
| EP | 3854630 A1 | 7/2021 | | |

OTHER PUBLICATIONS

Italian Search Report in IT Application No. 202300010572 mailed Nov. 27, 2023, an English Translation attached hereto (5 pages).

* cited by examiner

*Primary Examiner* — Rodney B White
(74) *Attorney, Agent, or Firm* — Leason Ellis LLP

(57) ABSTRACT

There is described a seat for a motor vehicle comprising a backrest, a seat cushion and a first bellows interposed between the backrest and the seat cushion, so as to allow the relative position between the backrest and the seat cushion to be adjusted.

8 Claims, 4 Drawing Sheets

SEAT FOR A MOTOR VEHICLE

CROSS-REFERENCE TO RELATED APPLICATIONS

This patent application claims priority from Italian patent application no. 102023000010572 filed on May 25, 2023, the entire disclosure of which is incorporated herein by reference.

TECHNICAL FIELD

The present invention relates to a seat for a motor vehicle.

BACKGROUND

Motor vehicles comprise, in a known manner, a plurality of seats, each formed by a respective seat cushion and by a respective backrest.

There are known seats used in motor vehicles destined for a particularly sporting use made of a rigid carbon monocoque structure.

These seats provide a high level of containment of the occupant, but do not allow the tilt angle between backrest and seat cushion to be adjusted.

There are also known reclinable seats normally used in motor vehicles and destined for ordinary road use. These seats allow the tilt angle between backrest and seat cushion to be adjusted, thereby adapting to the different anthropometric parameters of the user. Although these seats provide an acceptable level of comfort, they do not ensure an optimal level of containment of the occupant.

There is a need in the art to produce a seat that maximises containment during sporting use and, at the same time, that ensures a high level of comfort for the occupant and is adjustable so as to adapt to a wide range of anthropometric parameters of the occupant.

SUMMARY

The object of the present invention is to produce a seat for a motor vehicle that allows the aforesaid need to be satisfied.

The aforesaid object is achieved by the present invention, as it relates to a seat for a motor vehicle as defined by claim 1.

BRIEF DESCRIPTION OF THE DRAWINGS

For a better understanding of the present invention, a preferred embodiment is described below by way of non-limiting example and with reference to the accompanying drawings, wherein.

DESCRIPTION OF EMBODIMENTS

Figure 1:
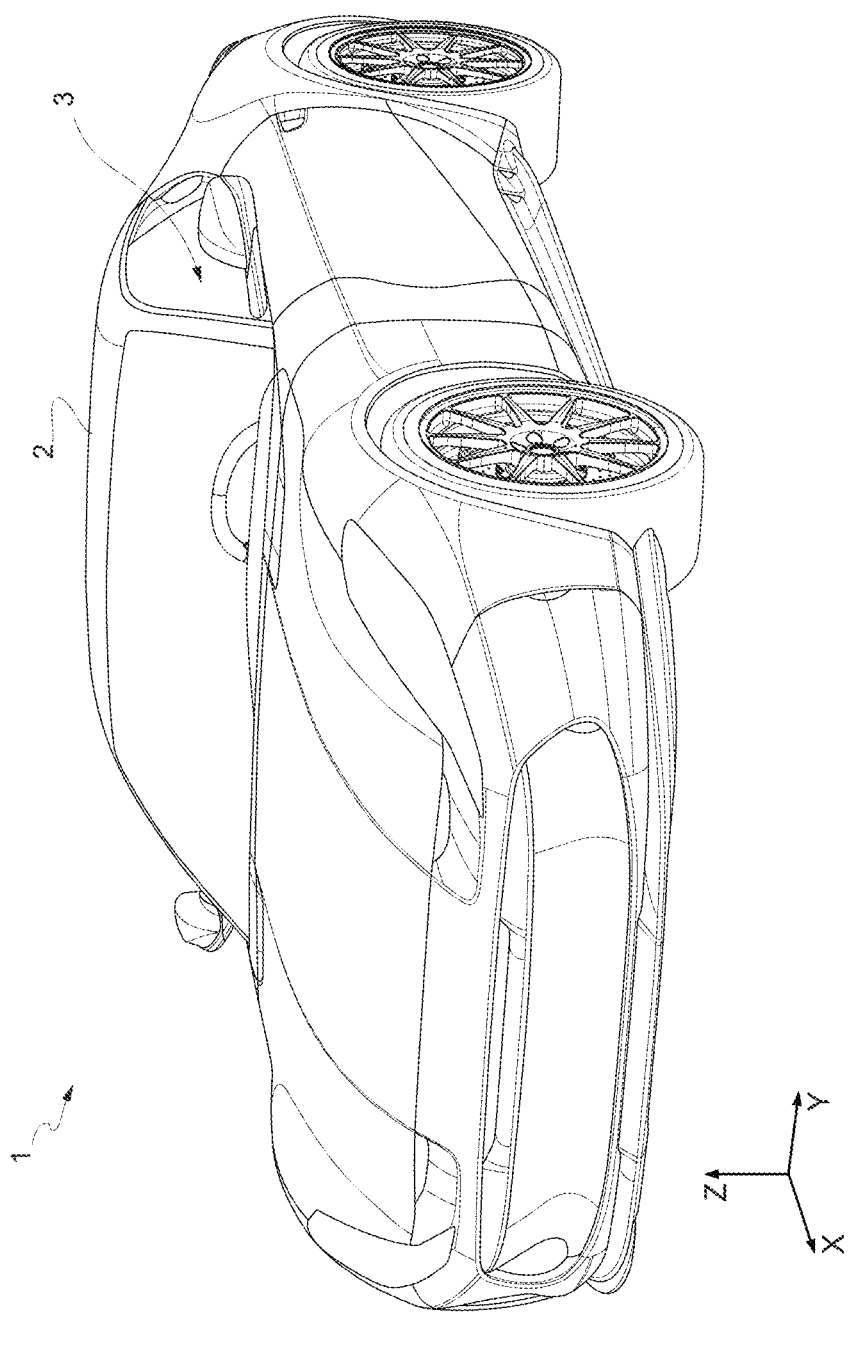
FIG. 1 is a perspective view of a motor vehicle comprising a seat produced according to the dictates of the present invention, with parts removed for clarity.

With reference to FIG. 1, the reference number 1 indicates a motor vehicle comprising a body 2 defining a passenger compartment 3.

It is specified that in the following description expressions such as "above", "below", "at the front", "at the rear" and similar are used with reference to conditions of normal forward movement of the motor vehicle 1.

It is also possible to define:

a longitudinal axis X integral with the motor vehicle 1, arranged, in use, horizontal and parallel to a normal direction of forward movement of the motor vehicle 1;

a transverse axis Y integral with the motor vehicle 1, arranged, in use, horizontal and orthogonal to the axis X; and an axis Z integral with the motor vehicle 1, arranged, in use, vertical and orthogonal to the axes X, Y.

Figure 2:
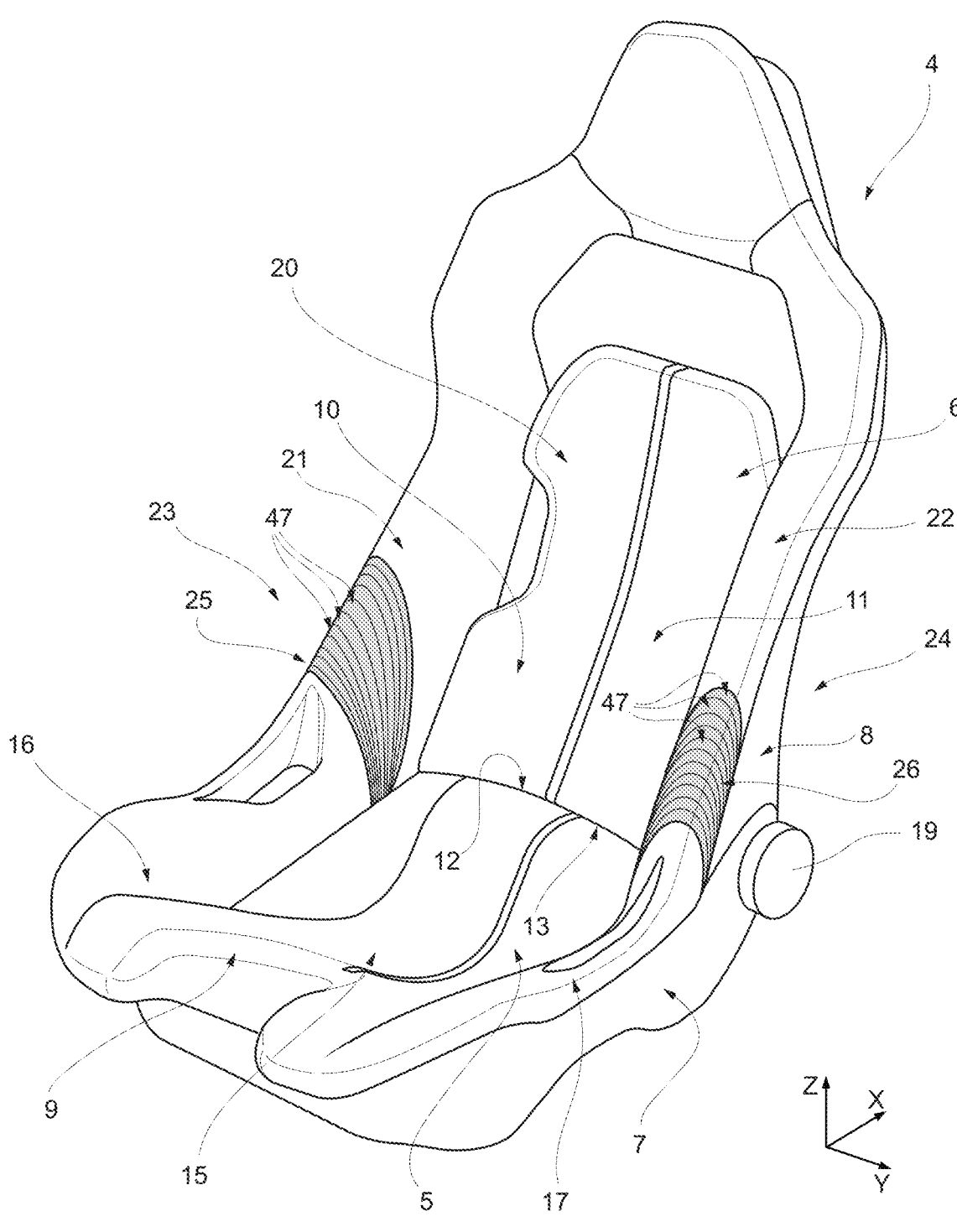
FIG. 2 is a perspective view in enlarged scale of the seat of the motor vehicle of FIG. 1.
Figure 3:
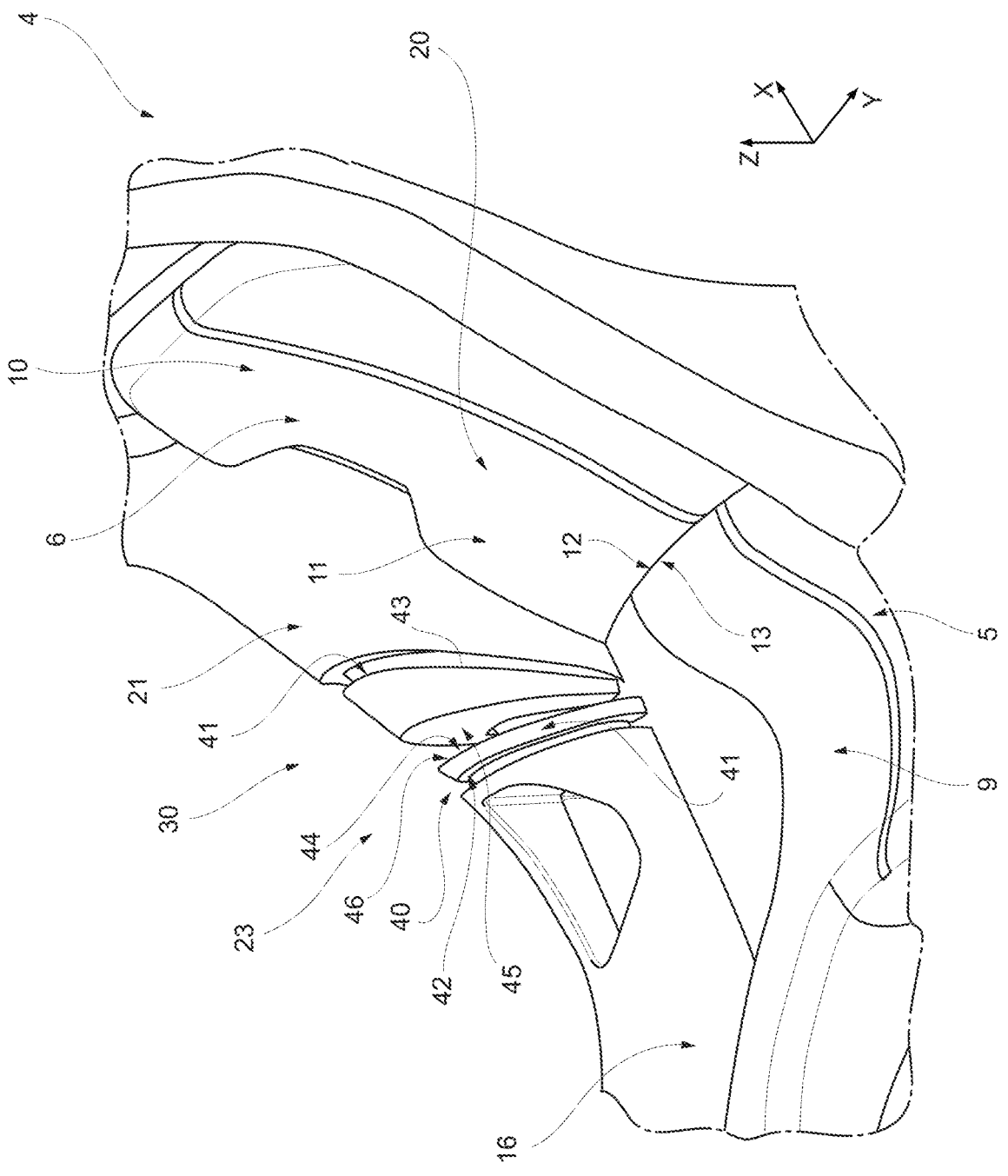
FIG. 3 is a perspective view of first details of the seat of FIG. 2, with parts removed for clarity.
Figure 4:
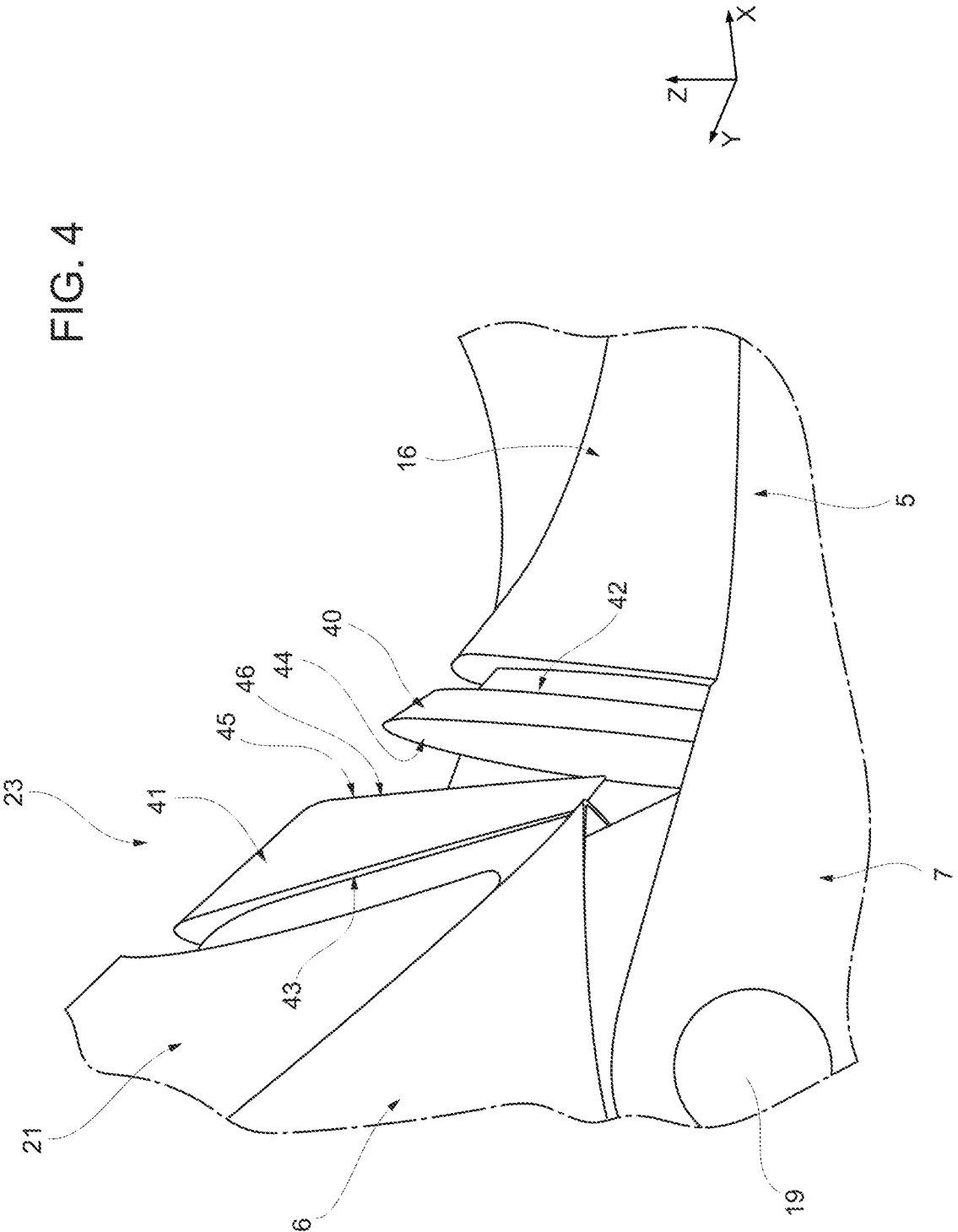
FIG. 4 is a perspective view of second details of the seat of FIG. 2, with parts removed for clarity.

The passenger compartment 3 comprises a plurality of front and rear seats 4 (only one of which is visible in FIGS. 2 to 4).

In the following description, reference will be made to a single seat 4, the seats 4 being similar to one another.

The seat 4 essentially comprises:

a seat cushion 5 on which the user sits; and a backrest 6 on which the user's back rests once seated.

The seat 4 is of reclinable type, i.e., it allows the tilt angle between backrest 6 and seat cushion 5 to be adjusted.

More in particular, the seat 4 comprises a control 19 that can be operated by the driver to rotate the backrest 6 with respect to the seat cushion 5 and block it in a desired position.

The seat cushion 5 and the backrest 6 each comprise:

a respective frame 7, 8; and a respective cushion 9, 10, which covers the corresponding frame 7, 8.

The cushions 9, 10 have respective end edges 12, 13 adjacent to one another and define a common surface 11 for supporting the user.

The end edges 12, 13 have a main direction of extension substantially parallel to the axis Y.

In more detail, the cushion 9 of the seat cushion 5 comprises:

a main portion 15, on which the user sits; and a pair of sides 16, 17 opposite one another, between which the main portion 15 extends and delimiting the portion 15 of respective lateral bands opposite one another.

The sides 16, 17 project cantilevered from the same part from the portion 15.

Similarly, the cushion 10 of the backrest 6 comprises:

a main portion 20, on which the user's back rests; and a pair of sides 21, 22 opposite one another, between which the main portion 20 extends and delimiting the portion 20 of respective lateral bands opposite one another.

The sides 21, 22 project cantilevered from the same part from the portion 20.

The side 16 is arranged in the area of the side 21.

The side 17 is arranged in the area of the side 22.

Advantageously, the seat 4 comprises a pair of bellows 23, 24 interposed between the backrest 6 and the seat cushion 5, so as to allow the relative position between backrest 6 and seat cushion 5 to be adjusted.

The bellows 23, 24 allow, in particular, the tilt angle between backrest 6 and seat cushion 5 to be adjusted so as to adapt the seat 4 to the anthropometric parameters of the user.

The bellows 23 is interposed between the sides 16, 21 and the bellows 24 is interposed between the sides 17, 22.

With reference to FIGS. 3 and 4, each bellows 23; 24 comprises, in turn:

a relative portion 30 made of foam and interposed between the respective sides 16, 21; 17, 22; and a relative elastic element 25, 26 arranged covering the relative portion 30 and partly defining the surface 11 of the seat 4.

Each portion 30 comprises, in turn (FIGS. 3 and 4):

an appendage 40 fixed to the relative side 16, 21; and an appendage 41 fixed to the relative side 17, 22.

The appendages 40, 41 have respective faces 42, 43 fixed to the respective sides 16, 21; 17, 22 and respective faces 44, 45 facing one another and opposite the corresponding faces 42, 43.

The faces 42, 43; 44, 45 are tapered proceeding upwards starting from the frame 7.

The appendages 40, 41 are made of foam or another elastic material.

The appendages 40, 41 define between them a cavity 46 without foam and suitable to allow lengthening and extension of the respective elastic elements 25, 26.

More in particular, the elastic element 25 connects the sides 16, 21 in a continuous manner and the elastic element 26 connects the sides 17, 22 in a continuous manner.

Each elastic element 25; 26 can be shortened and lengthened, according to a respective direction that connects the respective sides 16, 21; 17, 22.

In particular, each elastic element 25, 26 comprises a plurality of respective corrugations 47 consecutive to one another proceeding between respective sides 16, 21; 17, 22.

Alternatively, each elastic element 25, 26 is smooth without corrugation and adapts to the deformations caused by variation of the tilt between backrest 6 and seat cushion 5 by means of the elastic properties of the material of which it is made.

In the case illustrated, the elastic elements 25, 26 are made of fabric.

In the case illustrated, the elastic elements 25, 26 are of a colour similar to that of the cushions 9, 10.

Alternatively, the elastic elements 25, 26 are of a different colour from that of the cushions 9, 10.

In use, the driver adjusts the seat 4 acting on the control 19 so as to rotate the backrest 6 with respect to the seat cushion 5 until reaching the desired position corresponding to the desired tilt between backrest 6 and seat cushion 5 and, subsequently, blocks the backrest 6 in the desired position.

During tilting of the backrest 6 with respect to the seat cushion 5, the elastic elements 25, 26 of the bellows 23, 24 lengthen or shorten, according to whether the backrest 6 is moved away from or towards the seat cushion 5, maintaining the continuity between respective sides 16, 21 and 17, 22.

This lengthening or extension is made possible by the cavity 46 without foam.

From an examination of the present invention, the advantages that can be obtained therewith are evident.

The bellows 23, 24 are interposed between the backrest 6 and the seat cushion 5, so as allow the relative position between backrest 6 and seat cushion 5 to be adjusted.

At the same time, the bellows 23, 24 provide the seat 5 with a high containment capacity of the driver and defining, by means of the respective elastic elements 25, 26, part of the surface 11, make the seat 4 particularly comfortable for the driver.

The bellows 23; 24 are contiguous to the sides 16, 21; 17, 22 of the respective cushions 9, 10 and/or are made of fabric. In this way, the bellows 23, 24 do not alter the aesthetic impression of the seat 4 and improve the overall containment provided by the seat 4.

Due to the presence of the cavities 46 of each bellows 23, 24 interposed between the appendages 40, 41 made of foam and fixed to the backrest 6 and to the seat cushion 5, respectively, the relative elastic elements 25, 26 can easily lengthen and shorten, following the relative movement between backrest 6 and seat cushion 5.

The appendages 40, 41 effectively support the respective elastic elements 25, 26 of the corresponding bellows 23, 24.

Due to the fact that they are made of fabric and partly define the surface 11 of the seat 4, the elastic elements 25, 26 provide an aesthetic impression similar to that of the cushions 9, 10.

Finally, it is clear that modifications and variations can be made to the seat 4 produced according to the present invention, without departing from the scope of protection defined by the claims.

In particular, the seat 4 could comprise only one bellows 23, 24 and only one corresponding elastic element 25, 26.

The invention claimed is:

1. A seat for a motor vehicle comprising:

a backrest; and a seat cushion;

a first bellows interposed between said backrest and said seat cushion so as to allow the relative position between said backrest and seat cushion to be adjusted;

said seat cushion comprising a first lateral side and a second lateral side opposite one another; and said backrest comprising a third lateral and a fourth lateral side opposite one another and arranged in an area of said first lateral side and said second lateral side, respectively;

said first bellows being interposed between said first lateral side and said third lateral side corresponding to one another;

wherein said first bellows comprises, in turn, a portion made of foam and interposed between said first lateral side and said third lateral side; said first elastic element covering said portion.

2. The seat according to claim 1, further comprising a second bellows interposed between said second lateral side and said fourth lateral side;

said first and second bellows being opposite one another.

3. The seat according to claim 1, wherein said seat cushion and backrest comprise a first and a second cushion, respectively;

said first bellows being at least partly interposed between said first and second cushion and connecting said first and second cushion in a continuous manner.

4. The seat according to claim 1, wherein said first bellows comprises an elastic element defining an outer surface of said seat.

5. The seat according to claim 4, wherein said elastic element extends between said first and second cushion and can be extended or shortened according to a direction oriented from said first cushion to said second cushion.

6. The seat according to claim 1, wherein said portion comprises a first appendage fixed to said first lateral side and a second appendage fixed to said third lateral side;

said first and second appendage delimiting a cavity without said foam.

7. The seat according to claim 1, wherein said first elastic element is made of an elastically deformable fabric.

8. A motor vehicle comprising:

a passenger compartment; and at least one seat according to claim 1.

* * * * *